United States Patent
Wehrli (10) Patent No.: US 6,674,040 B2
(45) Date of Patent: Jan. 6, 2004

(54) CUTTING EROSION MACHINE TOOL

(75) Inventor: Peter Wehrli, Ascona (CH)

(73) Assignee: AGIE SA, Losone (CH)

(*) Notice: Subject to any disclaimer, the term of this patent is extended or adjusted under 35 U.S.C. 154(b) by 8 days.

(21) Appl. No.: 10/022,091

(22) Filed: Dec. 13, 2001

(65) Prior Publication Data

US 2002/0079292 A1 Jun. 27, 2002

(30) Foreign Application Priority Data

Dec. 21, 2000 (EP) ............................................. 00128147

(51) Int. Cl.$^7$ ................................................ B23H 7/02
(52) U.S. Cl. .............. 219/69.11; 83/651.1; 204/224 M; 219/69.12
(58) Field of Search ........................... 219/69.12, 69.11, 219/69.14; 83/651.1; 25/16.02; 204/224 M (56) References Cited

U.S. PATENT DOCUMENTS

| | | | | |
|---|---|---|---|---|
| 3,731,043 | A | 5/1973 | Ullmann et al. | 219/69.12 |
| 4,608,143 | A | 8/1986 | Inoue | 204/224 M |
| 4,647,747 | A | 3/1987 | Goto | 219/69.12 |
| 4,992,640 | A | 2/1991 | Tanaka et al. | 219/69.12 |
| 5,560,843 | A | 10/1996 | Koike et al. | 219/121.48 |
| 5,611,137 | A | 3/1997 | Braun | 29/560 |
| 5,897,791 | A | 4/1999 | Hayakawa | 219/69.12 |
| 5,911,888 | A * | 6/1999 | Girardin | 219/69.11 |
| 5,914,054 | A * | 6/1999 | Ito et al. | 219/69.11 |
| 6,486,429 | B1 * | 11/2002 | Wehrli et al. | 219/69.12 |

FOREIGN PATENT DOCUMENTS

| | | | | |
|---|---|---|---|---|
| DE | 20 52 123 | C3 | 12/1971 | |
| EP | 0 712 683 | B1 | 9/1995 | |
| EP | 0 779 124 | A1 | 5/1996 | |
| JP | 60-85828 | | 5/1985 | |
| JP | 61-34622 | | 2/1986 | |
| JP | 61-168424 | | 7/1986 | |
| JP | 61-168426 | | 7/1986 | |
| JP | 63-216629 | * | 9/1988 | 219/69.12 |
| JP | 63-306829 | | 12/1988 | |
| JP | 6-134622 | * | 5/1994 | 219/69.12 |
| JP | 8-118155 | * | 5/1996 | |

OTHER PUBLICATIONS

*European Search Report* corresponding to European Patent Application Serial No. 00 128 147.6, European Patent Office, dated Jun. 15, 2001, 3 pages.

* cited by examiner

*Primary Examiner*—Geoffrey S. Evans
(74) *Attorney, Agent, or Firm*—Marshall, Gerstein & Borun LLP

(57) ABSTRACT

A machine tool with a machine frame is disclosed. A first tool guide is provided on the frame to guide a tool to a first guide position. The first tool guide is a movable gantry carrier with a movable first sliding carriage. The tool guide can be moved with respect to the machine frame in a first plane along a first direction and in a second direction which is orthogonal with respect to the first direction. Furthermore, a second tool guide is provided on the machine frame to guide the tool to a second guide position. The second tool guide can be moved with respect to the machine frame in a second plane along a third direction and a fourth direction which is orthogonal to the third direction, independently of the first tool guide. Finally, a tool holder is provided on the machine frame to hold the machined part. The machined part is led between the first and the second guide positions of the tool. The second tool guide is a movable gantry carrier with a movable second sliding carriage.

28 Claims, 4 Drawing Sheets

CUTTING EROSION MACHINE TOOL

FIELD OF THE INVENTION

The invention relates generally to machine tools, and, more particularly, to a cutting erosion machine to machine parts of medium to very large size.

BACKGROUND OF THE INVENTION

Among the machine tools, spark erosion machines are widely used, for example, as cutting or countersink erosion machines. Here a machining tool, in the form of a wire electrode (cutting erosion machine) or a die sinking electrode (die sinking erosion machine), is moved relative to a machining used part which is clamped onto a work table in order to generate an electrical spark discharge between the machining electrode and the machined part. The construction of the machine substantially comprises a machine frame with drive kinematics to generate the relative shifting between the machined part and the machining electrode which determines the machining contour. For this purpose, in the countersink erosion machine, the machining electrode is led by an individual guide head, and, in the case of a cutting erosion machine, from a top wire guide head (first tool guide means) and a second wire guide head (second tool guide means). The machined part or group of machined parts is attached using appropriate clamps on a work table, with the part holding means. For the special case of spark erosion machines, a generator is also provided for the generation and control of the spark discharges, as well as CNC guide and installations for the rinsing of the work slot and the workup of a work fluid, if one is used.

The distinguishing characteristic of cutting erosion machines compared to other conventional machine tools (milling, drilling, circular saw or laser cutting machines, etc.) lies in that the tool (i.e., the wire electrode), must be led on both sides of the machined part (in a first and in a second guide position). This feature is also found, for example, in wire saw machines (for example, diamond wire saws) as well as in belt saw machines, etc. In the case of cutting erosion machines, the two wire guide heads can be moved in different tracks, to generate conical sections. Cutting erosion machines therefore usually have two axes of movement, X and Y (two directions which are orthogonal with respect to each other in a first movement plane) for the generation of the main contour, two axes of movement, U and V, for slanting the wire electrode (two additional directions which are orthogonal with respect to each other in a second movement plane), and a Z axis for the adaptation to the machined part or cutting height.

Machine tools, and especially spark erosion machines, can be used under many circumstances. Therefore, different construction forms have been developed, depending on the specific requirements, such as sales price, maintenance costs, machined part size and maximum displacement path, quality, productivity, flexibility and possibility to automate, space requirements, convenience of operation, etc. The focus in the development of a machine tool can therefore be quite different depending upon its intended application. Frequently such requirements oppose each other (for example, space requirements of the machine on the one hand and maximum possible machined part size, on the other hand). In the last-mentioned case in particular it would be desirable to have as compact a construction design as possible, while still being able to machine larger parts. These requirements are only partly satisfied, for example, in the construction designs for spark erosion machines known to date.

Below, the concepts used in the present description for referring to certain construction designs are explained with reference to special examples in spark erosion machines. Thus, in the case of spark erosion machines, a distinction is made in particular between a C machine frame and a gantry frame. In two special examples of the C machine frame, the horizontal movements are carried out either by the work table, and the electrode guide head performs only the vertical movement (C frame machine), or all horizontal and vertical machine movements are carried out by the electrode guide head (console machine). For this purpose, a so-called cross slide is attached to the machine frame, whose first unit (which is movable with reference to the machine frame) is only suspended or guided at one end on the machine frame. The C frame machine is used in light to medium heavy tool and profile making, while the console machine is used in medium to heavy tool and profile making. The gantry frame presents a higher rigidity and a higher damping capacity than the C machine frame, because the first movable unit is led at both of its ends with respect to the machine frame and, thus, forms the entire gantry. It is preferred, in particular, for very large part and electrode weights. However, it is also used in part in cases where a higher precision is expected.

In principle, the relative movement between the tool and the machined part is carried out either by the movement of the work table, or by the movement of the electrode guide head, or by a combination of the movement of the work table and the movement of the electrode guide head.

In a cutting erosion machine using the gantry construction type, the machine frame generally includes a machine bed and two posts as well as a crossbar arranged on it, forming a gantry carrier. As a result, in comparison to the C frame construction type, a higher rigidity and a more homogeneous expansion are obtained in case of temperature variations. Furthermore, a distinction is made between the machine tools with a rigidly attached gantry carrier and tools with a movable gantry carrier. In fixed gantry machines, a work table (including work containers on the machine bed), is arranged so it can be moved in a main axis direction (for example, the X direction), in a manner of speaking through the gantry carrier. The Y main axis movement of the wire electrode is disengaged therefrom and it is effected by a Y sliding carriage which can be moved horizontally on the crossbar above the work space. The machined part is thus moved in only one axis direction. The machine frame or bed, the posts and cross beams form a unit which is at rest. The lower wire guide head is typically attached by means of an L-shaped lower support arm to the upper Y sliding carriage. This support arm becomes quite long especially with larger machines, and, consequently, due to the long expansion distance, it reacts relatively sensitively to the applications of force and to thermal variations. In addition, installations with a carrier arm designed in that manner take up much space.

Furthermore, so-called gantry machines are known, in which the machined part is at rest during the machining, and the second main axis movement on the machined part is shifted. Here either the entire gantry carrier including the posts is moved with respect to the machine frame in the X main axis direction, or only its crossbar is moved. The advantage of the gantry machines lies in that the weight moved remains constant independently of the machining progress or the part to be machined in each case. Such a cutting erosion machine with movable gantry is known, for example, from DE 20 52 123. An additional example of the gantry construction design, this time in the field of milling machines, is described in EP 0 712 683. Here the two posts are designed in a manner of speaking as walls, and on them guides are arranged for the movement of the cross beam.

A cutting erosion machine is known from U.S. Pat. No. 4,992,640 which has an upper wire guide head in the gantry construction type, a fixed lower wire guide head, and a tool table which can be moved on a cross slide. JP 63-306829 furthermore describes a cutting erosion machine with an upper wire guide head in the gantry construction type, a machined part which is at rest, and a lower wire guide head, which is rigidly coupled, in the gantry construction design, to the upper wire guide head. In this regard, at least one movement of the upper wire guide head (for example, in the X main axis direction), is always coupled rigidly with the movement (for example, in the U direction), of the lower wire guide head. Only the Y main axis movement or the V movement of the two wire guide heads are independent of each other.

Finally, JP 61-34622, JP 61-168426 and JP 61-168424 describe a cutting erosion machine, in which the machined part is at rest, and the upper and lower wire guide heads are each designed as cross sliding carriages which can be moved independently of each other. The drawback of these cross sliding carriage systems is that the external dimensions of the machine are, disadvantageously, very large due to the long movement distances of the cross sliding carriages with respect to the maximum size of the parts to be machined.

This disclosure provides a machine tool wherein the maximum size of the machined part to be machined, or the movement distances are in an advantageous relationship with respect to the external dimensions of the machine tool.

SUMMARY OF THE INVENTION

A machine tool is provided which has a machine frame, a first tool guide provided on the machine frame to guide a tool in a first guide position, where the first tool guide is a movable gantry carrier with movable sliding carriage, so that the tool guide, with respect to the machine frame, can be moved in a first plane along a first direction and a second direction which is orthogonal with respect to the first direction a second tool guide provided on the machine frame to guide the tool in a second guide position, where the second tool guide, with respect to the machine frame, can be moved in a second plane along a third direction and a fourth direction which is orthogonal with respect to a third direction, independently of the first tool guide, and a part holder provided on the machine frame to hold the machined part, which is designed in such a manner that the machined part is led between the first and the second guide positions of the tool. The second tool guide is also designed as a movable gantry carrier with movable sliding carriages.

DETAILED DESCRIPTION

In FIGS. 1–4 identical reference numerals are used to refer to the same machined parts. Furthermore, the following terms "top," "bottom," "horizontal" and "vertical" should not be understood to be limiting, they are only used to improve the clarity of the description.

Although the following description focuses upon a special cutting erosion machine, the description should not be understood to be limiting, because other tool machines can also be made using the teachings of the invention, in which the tool is led in different guide positions, which are independent of each other (for example, a wire or belt saws, etc.).

In the preferred example shown in FIGS. 1–4, the cutting erosion machine comprises a machine frame 2, which rests on an approximately parallelepiped shaped machine bed 4. The machine bed 4 presents a front side 6, a back side 8, and two lateral surfaces 10 and 12. On each of the two lateral surfaces 10 and 12 of the machine bed 4, a lateral wall 14 and 16 is arranged, which extends upward, preferably up to approximately the level of the maximum part height. On the top margins of the lateral surfaces 14 and 16, guides 18 and 20 for an upper first crossbar 22 of a gantry carrier are arranged horizontally in the longitudinal direction of the margins. In the lateral walls 14 and 16, window-shaped recesses 24 are provided, the recesses 24 also run horizontally in the longitudinal direction of the lateral walls 14 and 16. The recesses 24 are measured in the longitudinal direction in such a manner that, on the external sides of the lateral walls 14 and 16, only column-shaped sections 26 remain standing. On the lower window margins—in particular immediately on the machine bed 4—of the window-shaped recesses 24, two additional guides 28 are located for a lower second cross beam 30. Thanks to this window-shaped recess design, the construction width of the cutting erosion machines can be reduced by several 100 millimeters.

In an alternative embodiment, which is not shown, the guides 28 for the lower cross beam can also be arranged laterally on each lateral wall 14 and 16, or immediately on the machine bed 4, and, in that case, the recesses 24 can be omitted. If the lateral walls 14 and 16 are completely omitted, then, in an additional alternative embodiment, the two guides 18 and 20 for the upper bar 22 can in each case be attached to one lateral cross beam, which in turn rests by means of a front and a back column on the machine bed 4. As a result, two bridges are formed. Under the two bridges there is thus an opening toward the work space. The two guides 28 for the lower crossbar can then be suspended on the bottom side of each cross beam or, alternatively, they can be arranged immediately on the machine bed 4 in the opening. In addition, the two lateral walls 14 or 16, or bridges, can advantageously be connected on the back side 8 by a back wall (not shown), which achieves an additional supportive effect. In this case, the back wall functions as a machined part of the work container (see below). Alternatively, the bridges arranged on both sides 10 and 12 of the machine bed 4 can be connected by at least one additional bridge, arranged on the back side 8 and/or the front side 6, with the result that—as above—higher rigidity is achieved. The openings which are formed in the front side 6, at the top and on the back side 8 can then be used for loading and unloading the machined parts or palettes with clamped machined parts.

The embodiment shown in FIGS. 1–4 shows a design based advantage of the gantry construction type. The guides 18 and 20 can be extended, at low cost, toward the back in such a manner that the upper first crossbar 22, in its backmost position, clears the work space to such an extent that the loading (for example, with a crane, a fork lift or other assisting machines) of larger machined parts is substantially facilitated.

Large wire erosion machines optimize the use of the bottom surface, because the main axes $X_{top}$ or $X_{bottom}$ are arranged laterally next to the work space, and the main axes $Y_{top}$ or $Y_{bottom}$ are arranged above or below the machined part, directly in the work space.

Compared to known designs of very large wire erosion machines, the preferred embodiment has an additional advantage. Specifically, the clamping surface area for the machined part is at an ergonomically ideal height of approximately 1100 mm. This ideal height is possible because the stiffness of the machine frame 2 does not depend on the cross section (surface area moment) of the machine bed.

It is known that high precision spark erosion machining is usually carried out in a bath of a dielectric working fluid to rinse the work slot and to achieve thermal stability of the machined part. For this purpose, the cutting erosion machine has a work container 32 for receiving the work fluid, which surrounds the work space and which is filled with the work fluid before each machining operation. After the completion of the machining, the work fluid is let out of the work container 32, and the work container 32 is opened to load and unload the machined part. In this case, the work container 32 is appropriately designed, for example, with a first (not explicitly shown) (optionally automatically actuated) door at the front side 6 and/or a second (also not explicitly shown) (optionally automatically actuated) door on the back side 8.

With an appropriate design of the machine frame 2, a certain volume remains available below the work space, in which it is possible to accommodate some or all the modules of the cutting erosion machines, for example, the unit for the workup of the work fluid. As a result, the use of space is improved, and the integration of the cutting erosion machine itself is also improved, which in turn leads to economic advantages. In cutting erosion machines with bath, the free space in the machine frame 2 becomes particularly advantageous for accommodating the work fluid in a corresponding container (not shown) during the emptying of the work container 32. The work fluid, which can be regulated to +/−0.5°, then advantageously contributes to the thermal stabilization of the machine frame 2. It is precisely in this case that, advantageously, at least the machine bed 4 is made of polymer concrete.

It is preferred for the cutting erosion machine to comprise, inside the work container 32, a part holder in the form of a plate-shaped part clamping frame 34 having a substantially rectangular opening. At least a part of the part clamping frame 34 can be attached to the two lateral walls 14 and 16 or to the bridges above the passages for the lower second crossbar 30 through the lateral walls of the work container 32. The path of the gravitational force of the machined part to the floor thus becomes very short. Advantageously, the part clamping frame 34 is thus at least partially integrated in the machine frame 2. In this case, the part clamping frame 34 can also be made of polymer concrete. Other parts as well, for example, the two lateral walls 14 and 16, and even the two crossbars 22 and 30, can also be made of polymer concrete.

Wire erosion machines (in particular those used for machining large parts), are frequently installed manually. This is not uneconomical, because the machining time in the case of large machined parts is in any case much longer than the installation time. Already with machines of medium size it is difficult for the operator to reach every point of the work space. The access and the work container 32 therefore must be designed in such a manner that the operator can either get directly to the machined part clamping frame 34, or he can enter directly into the work space or the work container 32, in the case of particularly large machines.

Along the upper first crossbar 22 of the upper gantry carrier, an upper first sliding carriage 36 can be moved, for example, in the $X_{top}$ direction. For this purpose, special guides 38, in the depicted example, are provided to guide the sliding carriage 36 on the front lateral wall of the crossbar 22. The upper first crossbar 22 can be moved orthogonally with respect to the upper first sliding carriage 36 in the $Y_{top}$ direction. A spindle sleeve 40 is again attached by means of appropriate vertical running guides 39 to the upper first sliding carriage 36. The spindle sleeve 40 can be moved in the Z direction to adapt to the machined part height. At the lower end of the spindle sleeve 40, an upper wire guide head 41 is attached. Overall, the upper wire guide head 41 is moved like the work head of a conventional Gantry machining center.

A lower wire guide head 43 is then moved, independently of the upper wire guide head 41, with separate guide and drive mechanism. For this purpose, a lower second sliding carriage 42 is provided, which can be moved along the longitudinal direction of the lower second crossbar 30, parallel to the $X_{top}$ direction, in the $X_{bottom}$ direction. The lower crossbar 30 can be moved orthogonal with respect to the lower sliding carriage 42 and parallel to the $Y_{top}$ direction in the $Y_{bottom}$ direction. The lower crossbar 30, which replaces the conventional L-shaped projecting wire guide arm, is supported, like the upper crossbar 22, on both sides, and guided on both sides. Thus, it is also moved like the work head of a conventional Gantry machining center. The bottom wire guide head 43 is now attached to the lower sliding carriage 42. Overall, the tool (i.e., the wire electrode), when the machined part is at rest, is led in two different guide positions, at the lower 43 and the upper wire guide head 41, in each case with a movable gantry carrier 22 and 30 with movable sliding carriage 36 and 42, in the sense of a double gantry tool control or a modified gantry machine frame, in which the machine bed 4, the work table and/or clamping frame 34, the work container 32 and the machined part remain stationary. The two wire guide heads 41 and 43 are moved, independently of each other, below and above the tool, where any cylindrical and conical cutting contours can be produced. This construction should be distinguished from the state of the art with known structure, in which two different tools machine in each case the same machined part by a gantry tool control. These tools, in the state of the art, are also referred to as twin gantry tool machines.

Separate drives are available for moving the upper crossbar 22 of the upper sliding carriage 36 and the spindle sleeve 40. This also applies to the lower sliding carriage 42 and the upper crossbar 30. The largest portion of the axial drive of contemporary NC (numerical control) tool machines use auxiliary motors connected with ball bearing spindles and a direct or an indirect measurement system. In the disclosed devices, one can use the frequently used spherical threaded spindle drives as well as the direct drives. In wire erosion, only small axial speeds are reached. However, at the site of the machining, frequent relative motions with short stroke, directed forward or backward, occur. Therefore, it is preferred to use a micro drive which is superposed on the macro drive to achieve a precise and highly dynamic positioning of the wire guide heads 41 and 43.

Figure 1:
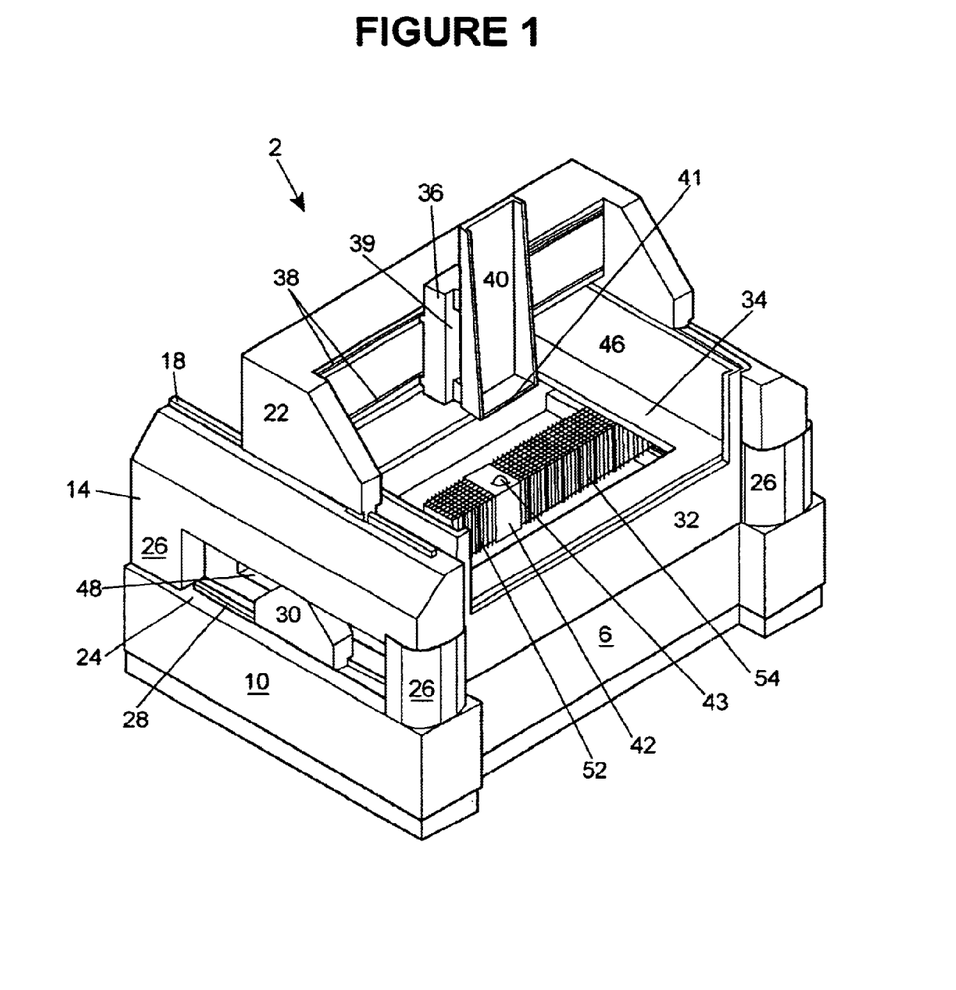
FIG. 1 is a schematic representation of a perspective view of a preferred cutting erosion machine constructed in accordance with the teachings of the invention.
Figure 2:
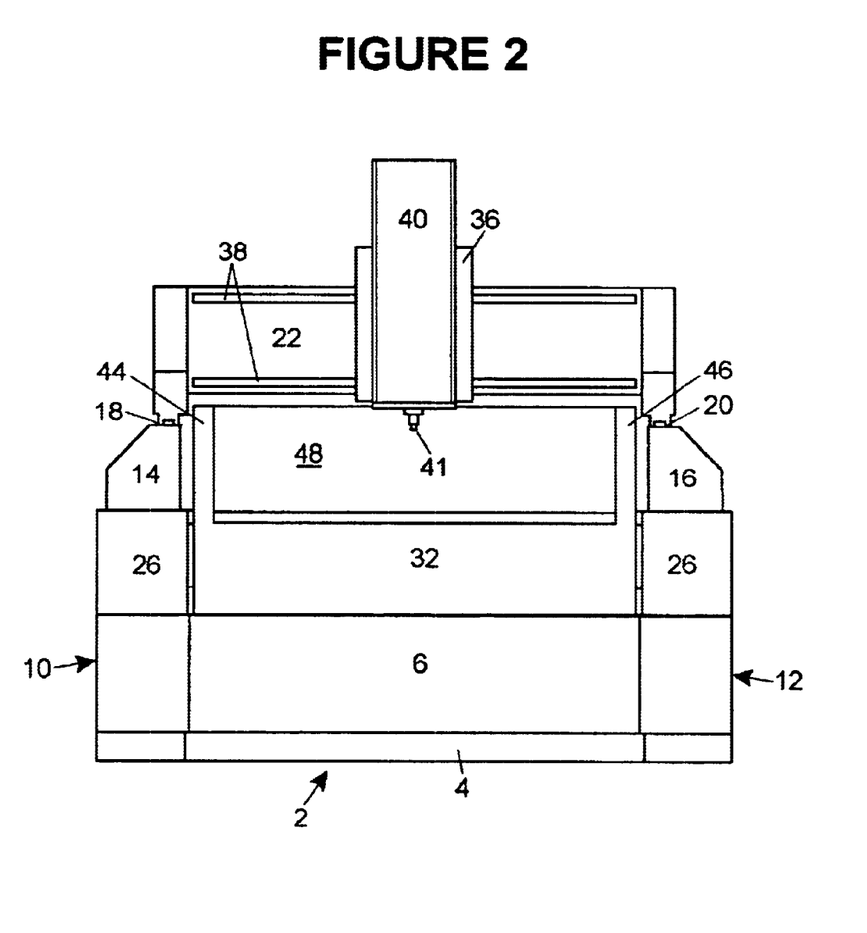
FIG. 2 is a lateral view of the machine of FIG. 1.
Figure 3:
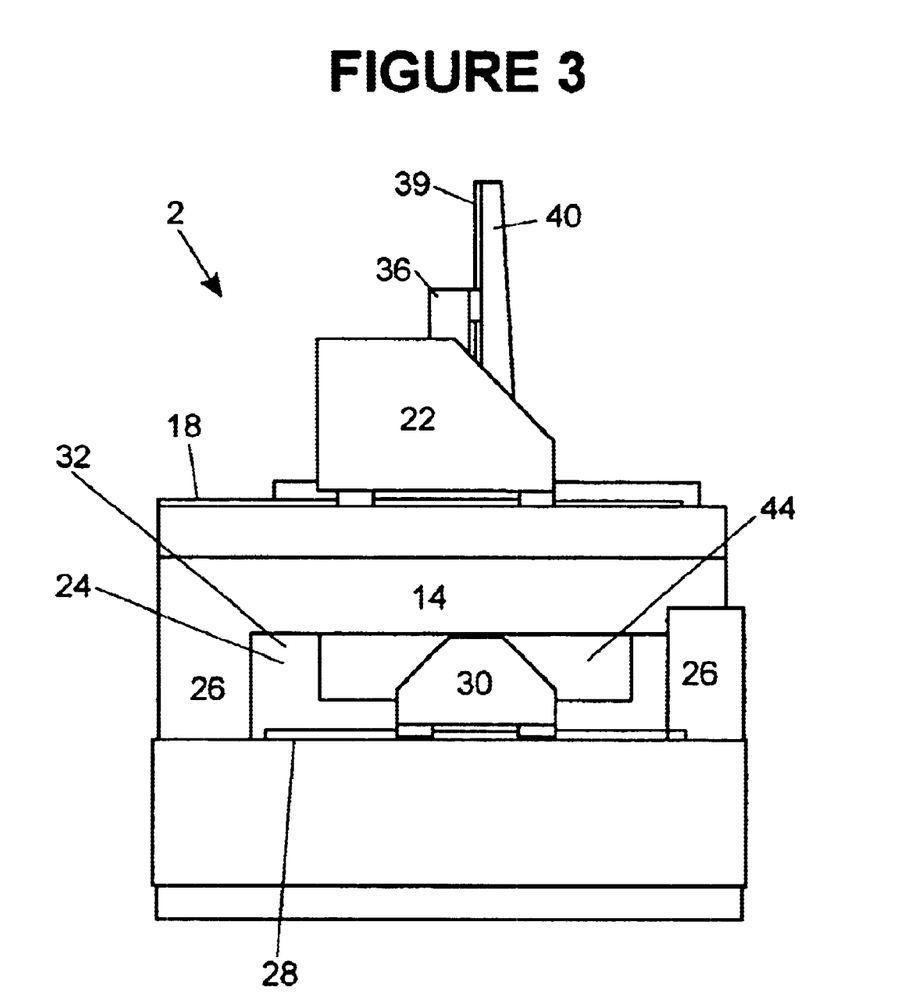
FIG. 3 is a front view of the machine shown FIG. 1.
Figure 4:
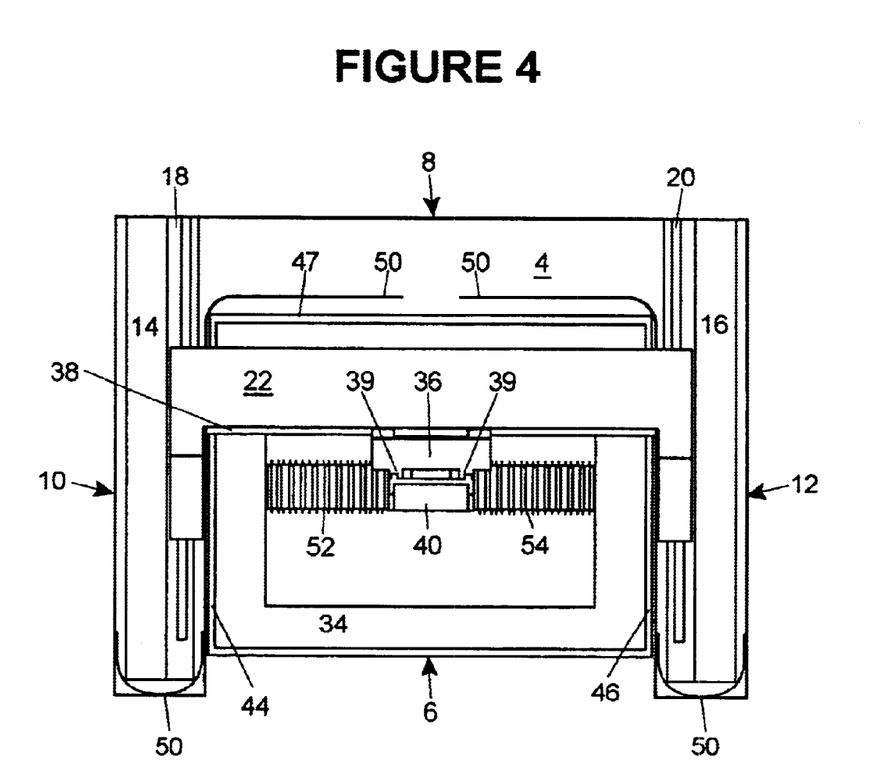
FIG. 4 is a top view of the machine shown in FIG. 1.

The lower crossbar 30 traverses the work container 32 at both lateral walls 44 and 46 and it moves, along its direction of movement, in each case in a window-shaped passage 48 in the two lateral walls 44 and 46 of the work container 32. In the case of cutting erosion machines, where a spark based erosive process is to occur in liquid bath, appropriate sealing measures must therefore be taken regarding the insertion of the lower crossbar 30 through the passages 48. For example, as indicated in FIG. 4, the latter measures can include using one metal sheet strip 50 per lateral wall 44 and 46, which is led in special guides of the lateral walls 14 and 15 of the machine frame 2 and the back wall 47 of the work container 32. The lower crossbar 30 is connected, in a manner which provides a seal against fluids, to the sheet metal strip 50, while the sheet metal strip 50 again is led in a movable manner opposite the two lateral walls 44 and 46 of the work container 32, and the internal space of the work container 32 is sealed, by means of appropriate sealing agents, from the external space in the window-shaped passages 48.

The lower sliding carriage 42 moves along the lower crossbar 30. For this purpose, the lower crossbar 30 is designed, for example, as a closed, generally rectangular profiled part, where a high resistance to torsion and bending is guaranteed. The guides of the lower sliding carriage 42 are preferably arranged on the front external side of the lower crossbar 30. The ball bearing drive for driving the lower sliding carriage 42, the lower sliding carriage 42 itself, and the lower wire guide head 43 are then preferably also arranged on the front external side of the lower crossbar 30. Thus, they are in a favorable position for assembly and maintenance work. Alternatively, the lower crossbar 30 can be generally U shaped in design, which has the effect that the guides, the spindles of the spherical threaded drive and the wire transport apparatus are at least partially integrated in the profiled part. However, this advantage has a detrimental effect on the torsion resistance. Because the crossbar 30 is moved through the work fluid, in this special example, the internal space of the crossbar 30 must be sealed from the work container 32 by appropriate sealing measures. In the example shown, bellows 52 and 54, running in the longitudinal direction of the lower crossbar 30, are provided on both sides of the lower sliding carriage 42 which is connected, at one of its ends, in a manner which provides a seal against fluids, to the sliding carriage 42 and, at the other end, for example, to metal sheet 50, which provides a seal against fluids. Naturally, other sealing variants are possible.

If the upper crossbar 22 and the upper sliding carriage 36 have been moved in the external position, for example, toward the back and to the left, then the work space toward the top remains largely free. Larger machined parts can now be loaded and unloaded without any difficulty, for example, with a crane. The front side 6 is left, to the extent possible, "in unmodified construction," so that, after opening the work container 32 or the container doors, the view onto the work space is open, and manual interventions can be made without difficulty. On the sides, due to the two lateral walls 14 and 16, there is in principle no possible access to the work space. However, as already mentioned with regard to possible automation means, such as robots, palette exchange systems, measurement and monitoring devices or other devices, the back side can have a design which is at least partially open.

Advantageously, using the illustrated machine design, starting at a certain stroke length, the external dimensions of the cutting erosion machine can be significantly reduced in comparison to similar cutting erosion machines with conventional design, so that, besides a lower space requirement at the site of installation, the effort required for transporting the installation is also reduced. Additional advantages of the preferred design illustrated herein include the fact that the wire guide heads 41 and 43 can be highly offset, and thus large wire inclinations can be adjusted even with machined parts having a great height. In this case, one can design the wire guide heads 41 and 43, in a known manner, so they can be oriented in such a manner that the wire electrode is not exposed to excessive wear. Furthermore, by means of this double gantry principle, certain components (for example, motors, guides, spherical threaded spindles, etc.), can be used simultaneously and repeatedly on the machine tool, because the exposure to stress and the stroke path of the two axial systems X/Y and U/V are similar. This results in advantageous savings in purchasing, service, storage management, etc. Machine specific parts as well, such as the crossbars 22 and 30 as well as the sliding carriages 36 and 42, can be the same under certain circumstances.

Finally, the illustrated construction is particularly well suited for machining medium sized to very large machined parts, although it is not limited to such parts. Furthermore, the precision and manufacturing costs in particular are optimized, a high rigidity as well as a good thermal behavior are achieved, and the user friendliness is improved (e.g., there is improved access to the work space, particularly for loading and unloading).

Advantageously, one can use the machine frame 2 and the two gantry carriers almost without any changes for the construction of a countersink erosion machine, a milling machine and other machine tools. Naturally, the typical characteristics of the cutting erosion machines as shown in FIGS. 1–4 must then be changed or removed. Therefore, the fundamental elements of the machine design described here are not limited to cutting erosion machines, but are also usable for other types of machine tools in which the machining is carried out by a relative movement of the tools in a guide position in an X/Y direction and in an additional guide position in a U/V direction, or by the movement of the part to be machined in an X/Y direction and by an independent movement of the machined part in a U/V direction (for example, milling machines, drills, grinding machines or similar machines). For this purpose, a module set is provided for the assembly of machine tools, particularly spark erosion machines, with several modules listed below: a central machine frame 2; a first tool guide, which can be provided on the machine frame 2 to guide a tool, where the first tool guide is designed as a movable gantry carrier with a movable sliding carriage, so that the tool guide can be moved with respect to the machine frame 2 in a first plane along a first direction and a second direction which is orthogonal with respect to the first direction, and (optionally) a second tool or part holder, which can be provided on the machine frame 2 to hold the tool or a machined part, where the second tool or part holder is a movable gantry carrier with a movable sliding carriage, so that the tool or part holder can be moved with respect to the machine frame 2 in a second plane along a third direction and a fourth direction which is orthogonal with respect to the third direction. These modules are designed in such a manner that they can be used for the assembly of different machine tools (for example, countersink erosion machines, cutting erosion machines, milling machines or similar machines). These basic modules form the components of a building set by means of which different machine tools can be assembled. The simplest variant consists in using only the basic elements, for example, to construct a milling or countersink erosion machine (with machined part at rest and only an upper tool design head which can be moved in the X/Y direction and the Z direction). If one adds to this variant the lower U/V head, one already obtains a cutting erosion machine. Thus, the substantially identical machine modules can be used for different machine variants, providing the advantage of a less expensive manufacture of machine tools.

In this context, it should be emphasized that the basic elements of this cutting erosion machines, such as the machine frame 2, the upper gantry carrier 22 with upper sliding carriage 36 and the work container 32 (except for the missing passages 48 in the lateral walls 44 and 46 for the lower wire guide arm) and the spindle sleeves 40 correspond to those of a countersink erosion machine. In other words, the modules of the illustrated machine can be used like a building block set both for a cutting and a countersink erosion machine, but also for other machine tools (for example, a milling machine or similar machine), with the advantage that the number of machined parts can be increased and the manufacturing costs can be lowered.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A cutting erosion machine comprising:

a machine frame;

an upper wire guide head on the machine frame to guide a first portion of a wire electrode to a first guide position, wherein the upper wire guide head comprises an upper movable gantry carrier with a movable upper sliding carriage, and wherein the upper wire guide head can move the wire electrode with respect to the machine frame in a first plane along a first direction and along a second direction which is orthogonal to the first direction, a lower wire guide head on the machine frame to guide a second portion of the wire electrode to a second guide position, wherein the lower wire guide head comprises a lower movable gantry carrier with a movable lower sliding carriage, and wherein the lower wire guide head can move the wire electrode independently of the upper wire guide head with respect to the machine frame in a second plane along a third direction and along a fourth direction which is orthogonal to the third direction;

a part holder cooperating with the machine frame to secure a machined part for engagement with the wire electrode; and, a work container for receiving the machined part and a work fluid during the machining, wherein the work container is arranged on the machine frame such that the lower gantry carrier traverses two opposite lateral walls of the work container.

2. A cutting erosion machine as defined in claim 1, wherein the part holder is located in a fixed position in relation to the machine frame.

3. A cutting erosion machine as defined in claim 1, wherein the position of at least one of the upper wire guide and the lower wire guide can be adjusted relative to the machined part.

4. A cutting erosion machine as defined in claim 1, wherein the upper gantry carrier is located above the lower gantry carrier, and the part holder locates the machined part between the upper and lower gantry carriers during machining.

5. A cutting erosion machine as defined in claim 1, wherein the upper and lower gantry carriers are mounted to the machine frame such that they can be moved in the same direction.

6. A cutting erosion machine as defined in claim 1, wherein the machine frame has two sides, a lateral wall is located on each of the two sides of the machine frame, and a guide for the upper gantry carrier is located on an upper portion of each of the lateral walls.

7. A cutting erosion machine as defined in claim 6, wherein an opening is defined in each of the lateral walls, and a guide for the lower gantry carrier is located in each of the openings.

8. A cutting erosion machine as defined in claim 7, wherein each of the guides for the lower gantry carrier is located directly on the machine frame at a lower border of a respective one of the openings in the lateral walls.

9. A cutting erosion machine as defined in claim 7, wherein each of the guides for the lower gantry carrier is suspended at an upper border of a respective one of the openings in the lateral wall.

10. A cutting erosion machine as defined in claim 6, wherein a guide of the lower gantry carrier is mounted adjacent an internal side of each of the lateral walls.

11. A cutting erosion machine as defined in claim 1, wherein the machine frame includes two sides, each of the sides of the machine frame includes two columns and a first cross beam resting on the two columns, and each of the first cross beams presents a guide for the upper gantry carrier.

12. A cutting erosion machine as defined in claim 1, wherein the machine frame includes a front side which is substantially open.

13. A cutting erosion machine as defined in claim 1, wherein the machine frame includes a back side which is at least partially open.

14. A cutting erosion machine as defined in claim 1, wherein the first plane is substantially parallel to the second plane.

15. A cutting erosion machine as defined in claim 14, wherein the first and third directions are substantially the same, the second and fourth directions are substantially the same, the upper gantry carrier includes a first crossbar, the lower gantry carrier includes a second crossbar, the first and second crossbars can be moved along the first direction, and the first and second sliding carriages can be moved along the second direction.

16. A cutting erosion machine as defined in claim 15, wherein at least one of the first and second crossbars can be moved over gantry columns.

17. A cutting erosion machine as defined in claim 15, wherein ends of at least one of the first and second crossbars can be moved directly on guides.

18. A cutting erosion machine as defined in claim 15, wherein the second crossbar has a substantially U-shaped profile, the lower sliding carriage is movably mounted on the second crossbar, and the lower sliding carriage is driven by a drive which is arranged at least in part inside the second crossbar.

19. A cutting erosion machine as defined in claim 15, wherein the second crossbar has a closed hollow profile, the lower sliding carriage is movably mounted on the second crossbar, the lower sliding carriage is driven by a drive located laterally on an outside of the second crossbar.

20. A cutting erosion machine as defined in claim 15, wherein the second crossbar includes a seal that seals an external space and an internal space of the second crossbar from each other regardless of the position of the lower sliding carriage with respect to the second crossbar.

21. A cutting erosion machine as defined in claim 15, further comprising a drive for moving at least one of the upper and lower sliding carriages and wherein the drive comprises a superimposed macro and micro movement drive.

22. A cutting erosion machine as defined in claim 1, wherein the upper wire guide head can be moved in a vertical direction with respect to the first plane.

23. A cutting erosion machine as defined in claim 1, wherein the machine frame includes two lateral walls, wherein a bridge is arranged on at least one of a back and a front of the machine frame, and wherein the bridge connects the two lateral walls.

24. A cutting erosion machine as defined in claim 1, wherein the machine frame includes two lateral walls and a back wall connecting the two lateral walls, and wherein the back wall has a height which corresponds approximately to a height of the work container.

25. A cutting erosion machine as defined in claim 21, wherein the back wall forms a wall of the work container.

26. A cutting erosion machine as defined in claim 1, wherein a second container is provided below the work container for receiving the work fluid during draining of the work container.

27. A cutting erosion machine as defined in claim 1, wherein the work container includes lateral walls which have a seal that seals an external space and an internal space of the work container from each other regardless of the position of the lower gantry carrier.

28. A cutting erosion machine as defined in claim 1, wherein the work holder comprises a clamp frame for clamping the machined part, the clamp frame being attached to the machine frame.

* * * * *